(No Model.)
C. N. SEVERANCE.
SULKY PLOW DEVICE FOR ATTACHING PLOWS TO RUNNING GEAR.
No. 342,469. Patented May 25, 1886.
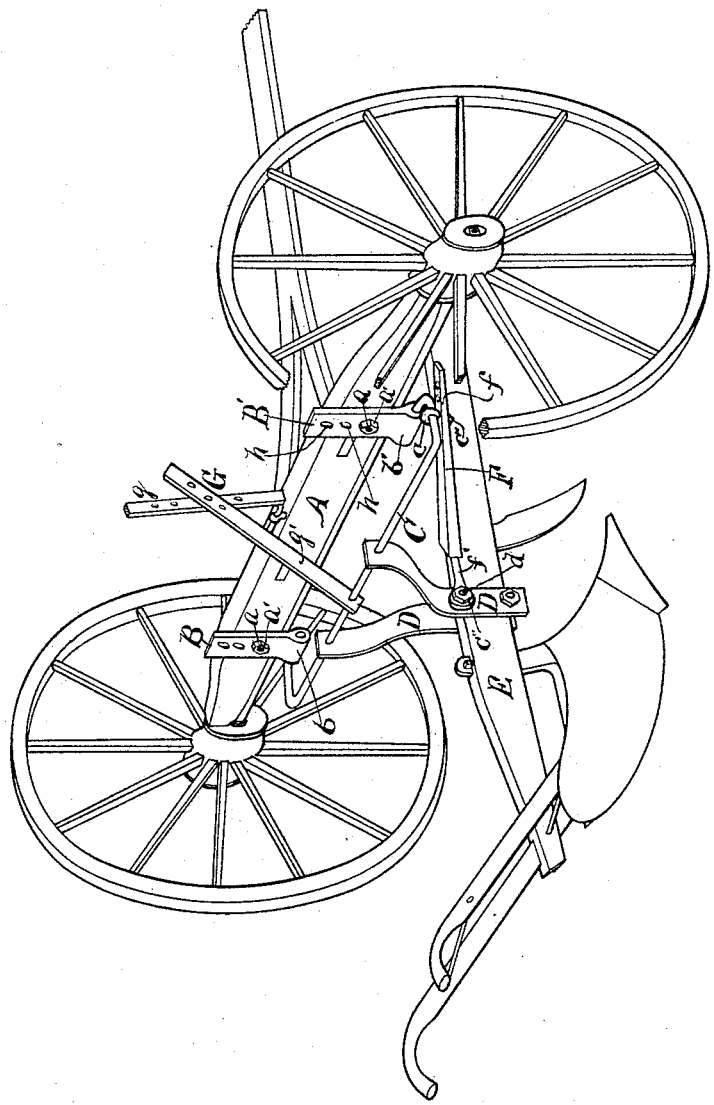
Witnesses:
Frederick M. ...
Wm H Harlow
Inventor:
Charles N. Severance
By J. R. ... atty

UNITED STATES PATENT OFFICE.

CHARLES N. SEVERANCE, OF WINTERPORT, MAINE.

SULKY-PLOW DEVICE FOR ATTACHING PLOWS TO RUNNING-GEAR.

SPECIFICATION forming part of Letters Patent No. 342,469, dated May 25, 1886.

Application filed September 16, 1885. Serial No. 177,294. (No model.)

*To all whom it may concern:*

Be it known that I, CHARLES N. SEVERANCE, a citizen of the United States, residing at Winterport, in the county of Waldo and State of Maine, have invented a new and useful Sulky-Plow and Device for Attaching Plows to Running-Gear; and I do hereby declare that the following is a full, clear, and exact description of the invention, which will enable others skilled in the art to which it appertains to make and use the same.

My invention relates to an improvement in sulky-plows; and it consists of a device whereby a hand-plow may be attached and adjusted to any common axle, so as automatically to vary its distance from the axle and preserve a substantially constant depth of furrow when one or both wheels of the sulky encounter inequalities in the surface of the ground. It is provided with means whereby the width of the furrow to be made may be varied according to the necessities of the case, and, also, whereby the plow may be used both for breaking ground and for ordinary plowing. It is illustrated in the accompanying drawing, in which the figure shows a perspective view.

In construction I provide the standards B B', each pierced with several bolt-holes, $h h$, whereby the standards may be pivotally bolted to an axle, A, at any desired point in the length of either standard, by screw-bolts $a\ a$ and nuts $a'\ a'$, the bolts $a\ a$ passing through the axle A and bolt-holes $h\ h$ in the standards.

At the lower ends of the standards B B', I form the boxes $b\ b'$, and journaled in these boxes are the turned-in ends of the bent bail C, upon which bail hang and turn loosely the spreading double standards D D, the lower ends of which are formed to be detachably bolted or clamped to the plow-beam E.

To regulate the position of the standards D D on the bail, and hence the position of the plow with reference to the ends of the axle, and to aid in holding the cant of the plow, I provide the arm F, formed of the parts $f$ and $f'$. The part $f$ is attached to one of the bent arms (preferably the left arm) of the bail C by an eyebolt, $c$, and nut $c'$, to admit of its swinging vertically upon the arm of the bail, and the part $f'$, being merely a bent extension of the part $f$, terminates in an eye or box, $c''$, in which a stud or arbor, $d$, projecting from the standards D D or from the beam E, may turn slightly and relieve the arm F from the strain of any irregular motion of the plow. The part $f$ of the arm F is made adjustable longitudinally upon the bent arm of the bail C, whereby the position of the standards D D on the bail may be shifted. The plow thus hanging loosely from the bail C, turning in the boxes $b\ b'$, is controlled by the compound lever G, formed of the parts $g$ and $g'$. The lower end of the part $g$ is detachably hinged or pivoted to a convenient point upon the axle A, and the part $g'$ is hinged or pivoted at its lower end to the bail C, between the standards D D, and at its upper end to a convenient point upon the part $g$. The part $g'$ is also made adjustable at different points in its own length upon the part $g$. The draft is, as usual, applied to the forward end of the beam E. When the lever G is thrown forward, the bail and plow are raised, and when it is elevated toward the perpendicular the bail and plow are lowered. The plow not being hung directly to the axle, but to the swinging bail, it follows that when one or both wheels encounter a rise in the ground the weight of the plow pulls the bail down and raises the lever G; or if the wheel encounters a depression the resistance of the soil below the plowshare, acting through the standards D D, lifts the bail and throws the lever forward. The mechanism thus working automatically insures a furrow of substantially uniform depth in very uneven ground.

In breaking ground the standards B B' are adjusted so that the bail C may be substantially horizontal, and in plowing with one wheel in a furrow the standard opposite that wheel is lowered and the bail still kept horizontal.

If it be desired to plow a wide furrow, the standard B is so adjusted as to keep the bail horizontal, and the bottom of the plowshare level. If a narrow furrow be required, the standard B is depressed and the plow canted.

To use my device it is only necessary that a common axle be provided with an eyebolt or equivalent device, as shown in the drawing, for the attachment of the part $g$ of the lever, and with bolt-holes formed horizontally across its (the axle's) width.

To establish a connection between a common hand-plow and a common axle with my device, the lower end of the part $g$ of the lever is pivotally attached to the axle by eyebolts, as shown, or by an equivalent device, and the standards B B' are pivotally bolted to the axle A at any desired elevation by bolts $a\,a$, secured by nuts $a'\,a'$, and the lower ends of the standards D D are clamped or bolted to the plow-beam E. The whole operation can be easily and quickly performed, and the connection device as quickly detached, after which both plow and axle are in condition for any other or ordinary use.

I am aware that some parts of my combination considered separately and by themselves are not new, and I do not claim, separately from my combination, the swinging bail C, the standards B B' or D D, or the lever G; but I am not aware of any existing device whereby a common hand-plow can be attached to a common cart-axle so as to serve the purpose of a wheel or sulky plow and as readily detached therefrom, so that both the hand-plow and the cart-axle can be returned to their respective original functions when not used as a wheel-plow.

My device is cheap, simple, and will in many cases obviate the necessity of the farmers buying the expensive wheel-plows in common use.

Having thus described my device, what I claim, and desire to secure by Letters Patent, is—

1. In a sulky-plow having the plow proper hung by any suitable means to a bail turning in boxes upon the axle, the arm F, pivoted at one end upon and secured to a spur or shaft upon the standards D D or plow-beam E, and at the other end adjustably and pivotally secured to the bent part of the arm of said bail.

2. In combination with the plow-beam clamp, the bail C, and the arm F, the adjustable standards (or hangers) B B', the slotted axle A, and the lever $g\,g'$, all as shown and described, and substantially as and for the purpose specified.

CHARLES N. SEVERANCE.

Witnesses:
E. O. GOODRIDGE,
WM. H. HARLOW.